(12) United States Patent
Zhao et al.

(10) Patent No.: US 6,516,114 B2
(45) Date of Patent: Feb. 4, 2003

(54) INTEGRATION OF FIBERS ON SUBSTRATES FABRICATED WITH GROOVES

(75) Inventors: Shulai Zhao, Encinitas, CA (US); Bo Pi, Carlsbad, CA (US)

(73) Assignee: Oluma, Inc., Carlsbad, CA (US)

(*) Notice: Subject to any disclaimer, the term of this patent is extended or adjusted under 35 U.S.C. 154(b) by 136 days.

(21) Appl. No.: 09/796,373

(22) Filed: Feb. 27, 2001

(65) Prior Publication Data

US 2001/0055443 A1 Dec. 27, 2001

Related U.S. Application Data

(60) Provisional application No. 60/214,686, filed on Jun. 27, 2000, and provisional application No. 60/214,589, filed on Jun. 27, 2000.

(51) Int. Cl.$^7$ .................................................. G02B 6/26
(52) U.S. Cl. ............................ 385/30; 385/15; 385/31; 385/39; 385/65
(58) Field of Search ........................ 385/15, 18, 30–32, 385/39, 47, 65, 83, 129–132, 50, 137

(56) References Cited

U.S. PATENT DOCUMENTS

| | | |
|---|---|---|
| 4,021,097 A | 5/1977 | McMahon |
| 4,136,929 A | 1/1979 | Suzaki |
| 4,259,016 A | 3/1981 | Schiffner |

(List continued on next page.)

FOREIGN PATENT DOCUMENTS

| | | |
|---|---|---|
| DE | 28 12 346 A1 | 3/1978 |
| EP | 0178045 A1 | 4/1986 |
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

McCallion et al., "Side–polished fiber provides functionality and transparency," (Abstract) Laser Focus World, vol. 34, No. 9, pp. S19–20, S22, S24, PennWell Publishing, Sep., 1998.

Das et al., "Automatic determination of the remaining cladding thickness of a single–mode fiber half–coupler," (Abstract) Optics Letters, vol. 19, No. 6, pp. 384–6, Mar. 15, 1994.

Ishikawa et al., "A new optical attenuator using the thermal diffusion of W–cladding fiber," (Abstract) MOC/GRIN '97 Technical Digest of the 6$^{th}$ Microoptics Conf./14$^{th}$ Topical Meeting on Gradient–Index Optical Systems in Tokyo, Japan, p. (vii+432+27), 208–11, Oct. 1997.

(List continued on next page.)

*Primary Examiner*—John D. Lee
*Assistant Examiner*—Jennifer Doan
(74) *Attorney, Agent, or Firm*—Fish & Richardson P.C.

(57) ABSTRACT

Techniques and devices for integrating optical fibers on substrates with grooves for various optical applications. Two openings that penetrate through the substrate are formed at both ends of each groove to allow a fiber to pass from one side of substrate to another side. The fiber cladding of a fiber portion positioned in the groove can be removed to produce an optical coupling port.

49 Claims, 12 Drawing Sheets

U.S. PATENT DOCUMENTS

| | | |
|---|---|---|
| 4,301,543 A | 11/1981 | Palmer |
| 4,302,071 A | 11/1981 | Winzer |
| 4,307,933 A | 12/1981 | Palmer et al. |
| 4,315,666 A | 2/1982 | Hicks, Jr. |
| 4,378,539 A | 3/1983 | Swanson |
| 4,392,712 A | 7/1983 | Ozeki |
| 4,431,260 A | 2/1984 | Palmer |
| 4,479,701 A * | 10/1984 | Newton et al. .......... 350/96.16 |
| 4,493,528 A | 1/1985 | Shaw et al. |
| 4,536,058 A | 8/1985 | Shaw et al. |
| 4,556,279 A | 12/1985 | Shaw et al. |
| 4,560,234 A * | 12/1985 | Shaw et al. .............. 350/96.15 |
| 4,564,262 A | 1/1986 | Shaw |
| 4,601,541 A | 7/1986 | Shaw et al. |
| 4,688,882 A | 8/1987 | Failes |
| 4,721,352 A * | 1/1988 | Sorin et al. .............. 350/96.15 |
| 4,723,827 A * | 2/1988 | Shaw et al. .............. 350/96.15 |
| 4,778,237 A * | 10/1988 | Sorin et al. .............. 350/96.15 |
| 4,828,350 A | 5/1989 | Kim et al. |
| 4,842,358 A * | 6/1989 | Hall ........................ 350/96.15 |
| 4,869,567 A | 9/1989 | Millar et al. |
| 4,896,932 A | 1/1990 | Cassidy |
| 4,900,118 A | 2/1990 | Yanagawa et al. |
| 4,986,624 A | 1/1991 | Sorin et al. |
| 4,991,922 A | 2/1991 | Dahlgren |
| 5,029,961 A | 7/1991 | Suzuki et al. |
| 5,042,896 A | 8/1991 | Dahlgren |
| 5,100,219 A | 3/1992 | Takahashi |
| 5,329,607 A | 7/1994 | Kamikawa et al. |
| 5,444,723 A | 8/1995 | Chandonnet et al. |
| 5,533,155 A | 7/1996 | Barberio et al. |
| 5,586,205 A | 12/1996 | Chen et al. |
| 5,623,567 A | 4/1997 | Barberio et al. |
| 5,651,085 A | 7/1997 | Chia |
| 5,729,641 A | 3/1998 | Chandonnet et al. |
| 5,781,675 A | 7/1998 | Tseng et al. |
| 5,809,188 A | 9/1998 | Tseng et al. |
| 5,841,926 A | 11/1998 | Takeuchi et al. |
| 5,854,864 A | 12/1998 | Knoesen et al. |
| 5,892,857 A | 4/1999 | McCallion |
| 5,900,983 A | 5/1999 | Ford et al. |
| 5,903,685 A | 5/1999 | Jones et al. |
| 5,915,063 A | 6/1999 | Colbourne et al. |
| 5,940,556 A | 8/1999 | Moslehi et al. |
| 5,963,291 A | 10/1999 | Wu et al. |
| 5,966,493 A | 10/1999 | Wagoner et al. |
| 5,970,201 A | 10/1999 | Anthony et al. |
| 6,011,881 A | 1/2000 | Moslehi et al. |
| 6,026,205 A | 2/2000 | McCallion et al. |
| 6,038,359 A | 3/2000 | Moslehi et al. |
| 6,052,220 A | 4/2000 | Lawrence et al. |
| 6,058,226 A | 5/2000 | Starodubov |
| 6,130,984 A | 10/2000 | Shen et al. |
| 6,134,360 A | 10/2000 | Cheng et al. |
| 6,144,793 A | 11/2000 | Matsumoto et al. |
| 6,185,358 B1 | 2/2001 | Park |

OTHER PUBLICATIONS

Matejec et al., "Optical fiber with novel geometry for evanescent–wave sensing," (Abstract) Sensors and Actuators B, (Chemical), vol. B29, No. 1–3, pp. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, pp. 5197–201, Aug. 1, 1994.

Tomita et al., "Leaky–mode loss of the second propagating mode in single–mode fibres with index well profiles," (Abstract) Applied Optics, vol. 24, No. 11, pp. 1704–7, Jun. 1, 1995.

Leminger et al., "Determination of the variable core–to–surface spacing of single–mode fiber–coupler blocks," (Abstract) Optics Letters, vol. 12, No. 3, pp. 211–13, Mar., 1987.

Morshnev et al., "A fiber thermo–optical attenuator," (Abstract) Source: Radiotekhnika i Elektronika, Translated in: Soviet Journal of Communications Technology & Electronics, vol. 30, No. 9, pp. 148–50, Sep., 1985.

Takahashi Mitsuo, "Variable light attenuator of improved air–gap type with extremely low returning light," (Abstract) Conf. Record—IEEE Instrumentation and Measurement Tech. Conf. 2, pp. 947–950, 1994.

Schmidt et al., "New design approach for a programmable optical attenuator," (Abstract) Hewlett–Packard Journal, v. 46, n. 1, pp. 34–39, 1995.

Hayata et al., "Algebraically decaying modes of dielectric planar waveguides," Optics Letters, vol. 20, No. 10, pp. 1131–32, May 15, 1995.

Vengsarkar et al., "Photoinduced refractive–index changes in two–mode, elliptical–core fibers: sensing applications," Optics Letters, vol. 16, No. 19, pp. 1541–43, Oct. 1, 1991.

Pantchev et al., "Method of Refractive Index Profile Reconstruction from Effective Index of Planar Optical Monomode Waveguides: Application to Potassium Ion–Exchanged Waveguides," IEEE Journal of Quantum Electronics, vol. 29, No. 1, pp. 154–60, Jan. 1993.

Ikeda et al., "Analysis of the Attenuation Ratio of MQW Optical Intensity Modulator for 1.55 îm Wavelength Taking Account of Electron Wave Function Leakage," IEEE Journal of Quantum Electronics, vol. 32, No. 2, pp. 284–92, Feb. 1996.

S. Masuda, "Variable attenuator for use in single–mode fiber transmission systems," Applied Optics, vol. 19, No. 14, pp. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays," Optical Engineering, vol. 27, No. 1, pp. 045–49, Jan. 1988.

Scholl et al., "In–line fiber optical attenuator and powermeter," SPIE vol. 1792 Components for Fiber Optic Applications VII, pp. 65–70, 1992.

Tsujimoto et al., "Fabrication of Low–Loss 3 dB Couplers With Multimode Optical Fibres," Electronics Letters, vol. 14, No. 5, Mar. 2, 1978.

* cited by examiner

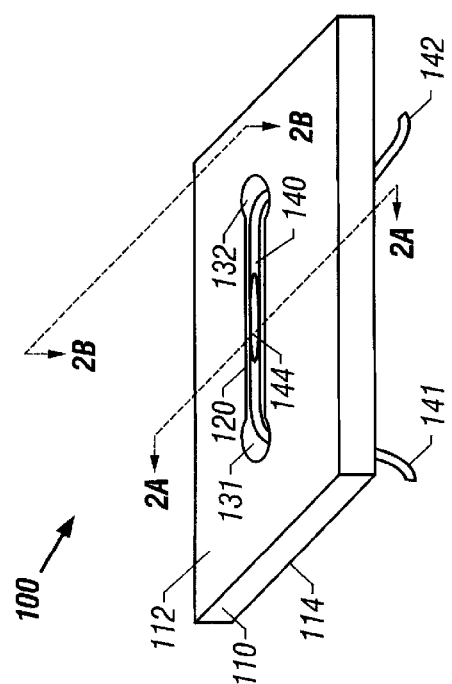
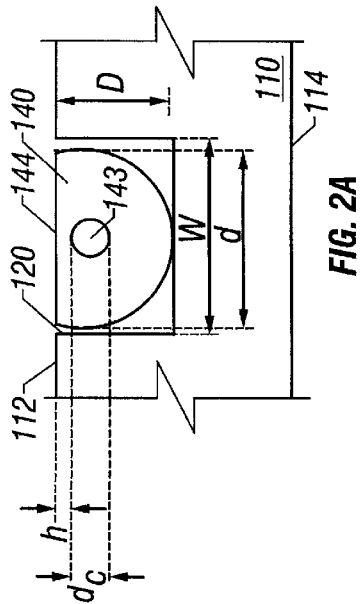
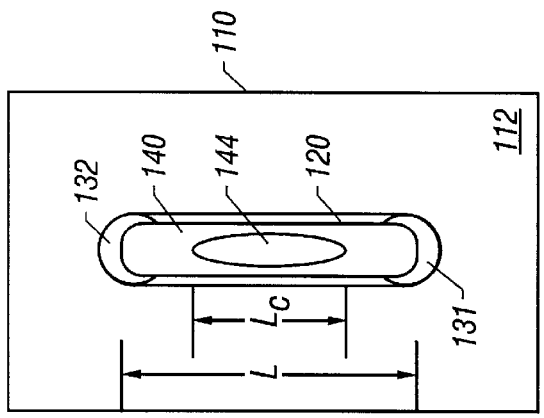

INTEGRATION OF FIBERS ON SUBSTRATES FABRICATED WITH GROOVES

This application claims the benefit of U.S. Provisional Application Nos. 60/214,686 entitled "Wafer scale fiber optic device fabrication technique for mass production", and 60/214,589 entitled "An integratable fiber optic coupling technique," both of which were filed on Jun. 27, 2000.

TECHNICAL FIELD

This application relates to integration of optical fibers on substrates to form various optical devices, and more specifically, to techniques and designs for integrating optical fibers in grooves formed in substrates.

BACKGROUND

Optical fibers are widely used in transmission and delivery of optical signals from one location to another in a variety of optical systems, including but not limited to fiber links and fiber networks for data communications and telecommunications. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism to spatially confine the optical energy of the light rays in one or more selected fiber modes to guide the optical energy along the fiber core.

The guided optical energy in the fiber, however, is not completely confined within the fiber core. A portion of the optical energy "leaks" through the interface between the fiber core and the cladding via an evanescent field that essentially decays as an exponential function of the distance from the core-cladding interface. The distance for a decay in the electric field of the guided light by a factor of $e \approx 2.718$ is about one wavelength of the guided optical energy. This evanescent leakage may be used to couple optical energy into or out of the fiber core, or alternatively, to perturb the guided optical energy in the fiber core.

For example, when two fiber cores are closely spaced from each other by a spacing on the order of one wavelength or less, optical coupling occurs between the two fiber cores through the overlap of the evanescent fields of the two fiber cores. This structure can be used to construct optical fiber couplers.

SUMMARY

One embodiment of the fiber devices of the present disclosure includes a substrate that is formed with an elongated groove on one substrate surface, and two openings respectively at two ends of the groove formed through the substrate to extend between the two sides of the substrate. An optical fiber is engaged to the substrate by passing through the two openings. The fiber has at least first, second, and third contiguous fiber portions, where the second fiber portion is disposed in the elongated groove on one side of the substrate, and the first and third fiber portions are located on or over the opposite substrate surface. The fiber cladding in the second fiber portion may be at least partially removed to form an optical coupling port for the fiber.

According to another embodiment, a fiber device may be formed in a substrate that includes grooves formed on both opposing sides of the substrate. The substrate has first and second opposing substrate surfaces, and first, second, and third openings that are spaced along a straight line and go through the substrate to extend between the first and the second substrate surfaces.

The first groove, elongated along the straight line and formed over the first substrate surface between the first and second openings, is configured to have a first end connected to the first opening and a second end connected to the second opening. The second groove, elongated along the straight line and formed over the second substrate surface between the second and third openings, is configured to have a first end connected to the second opening and a second end connected to the third opening. An optical fiber is engaged to the substrate by passing through the first, second, and third openings in the substrate to have a first fiber portion positioned in the first groove and a second fiber portion positioned in the second groove.

BRIEF DESCRIPTION OF THE DRAWINGS

FIG. 1 shows one embodiment of a fiber device that integrates a fiber to a substrate with a groove for positioning the fiber and openings for holding the fiber.

FIGS. 2A and 2B show a cross sectional view of the device in FIG. 1 along the direction AA' and a side view of the device in FIG. 1 along the direction BB', respectively.

DETAILED DESCRIPTION

Figure 3A:
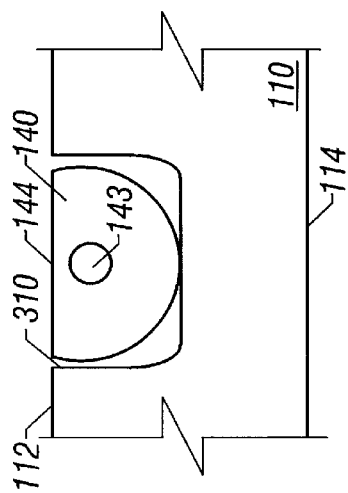
FIGS. 3A and 3B show examples of two different cross sections for grooves shown in FIG. 1.

FIGS. 1, 2A, and 2B illustrate one embodiment of a fiber device 100 that integrates a fiber 140 to a substrate 110. The device 100 may be used as a building block to construct a variety of fiber devices, including but not limited to, fiber couplers, fiber attenuators, fiber modulators, fiber beam splitters, optical fiber switches, and fiber frequency-division multiplexers.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W, of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D less than the fiber diameter d but greater than the sum of the fiber radius r=d/2 and radius of the fiber core $r_c=d_c/2$. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications such as the device shown in FIG. 12, the depth D of the entire groove 120 may be greater than fiber diameter d. Unless otherwise indicated, the following description will assume that at least a portion of the groove 120 has a depth D that satisfies $(d+d_c)/2<D<d$. For example, the central portion of the groove 120 may have a depth D less than d while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length Lc that is above the fiber core 143 and is substantially coplanar with the surface 112 of the substrate 110. When the spacing, h, between the flat surface 144 and the fiber core 142 is sufficiently small (e.g., on the order of one wavelength or less), the flat surface 144 can be used to couple optical energy into or out of the fiber core 144 through the evanescent fields outside the fiber core. Hence, the length, Lc, of the flat surface 144 approximately represents the optical coupling length for the fiber device 100.

Figure 3B:
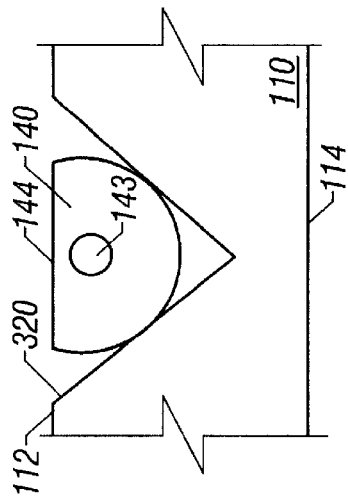
Figure 4A:
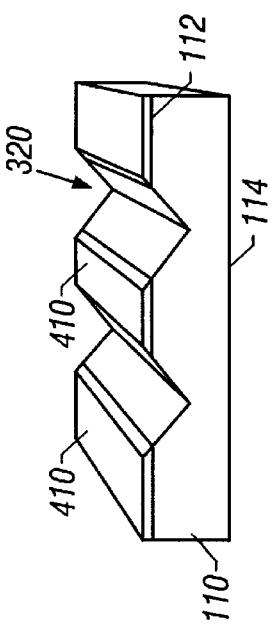
FIGS. 4A, 4B, 5A, 5B, 5C, 5D, and 5E illustrate a process of fabricating V grooves in semiconductor substrates by anistropic etching.
Figure 4B:
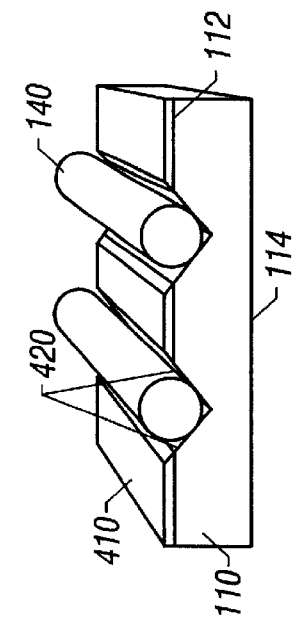

FIGS. 4A and 4B illustrate the fabrication of the V groove 320 and placement of the fiber 140 in the V groove 320 as shown in FIG. 3B. First, a mask layer 410 is deposited over the surface 112 of the substrate 110 and is patterned by a suitable technique such as a photolithography process to have one or more groove areas exposing the underlying substrate 110. Next, the exposed portions of the substrate 110 are anistropically etched to form V grooves.

If the substrate 110 is formed of a semiconductor, e.g., silicon, a thermally-grown silicon oxide or nitride film may be used as the etching mask 410 for anisotropic silicon etching. When the surface 112 is in the crystalline plane (100) of the Si substrate 110 and the groove patterns in the etching mask 410 are parallel to the crystalline plane (110), an etchant chemical such as alkaline (KOH) can be applied on the silicon (100) surface to produce truncated v-shaped grooves. Since the anisotropic etching is stopped at the crystalline plane (111), the dimension of the V grooves, such as the groove width and depth can be accurately controlled by properly selecting the dimension of the groove patterns formed in the etching mask 410.

Referring to FIG. 4B, after the grooves 320 are formed, the fibers 140 can be placed in the grooves 320 and bonded to the groves 320 at locations 420. The bonding may be implemented by a number of techniques, including but not limited to using an epoxy, glass frit thermal bond, or CO2 assisted thermal bond. When multiple grooves 320 are formed, an array of fibers 140 can be precisely aligned in the grooves 320 with a predetermined spacing. The exposed cladding of the fiber 140 can then be removed and polished to form the flat surface 144 as shown in FIG. 3B.

Figure 5C:
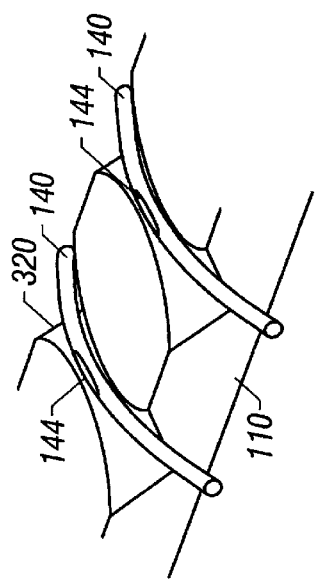
Figure 5B:
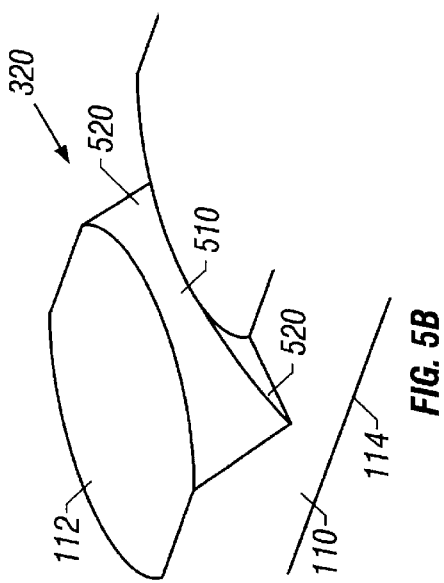
Figure 5A:
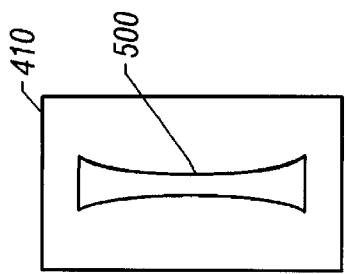
Figure 5E:
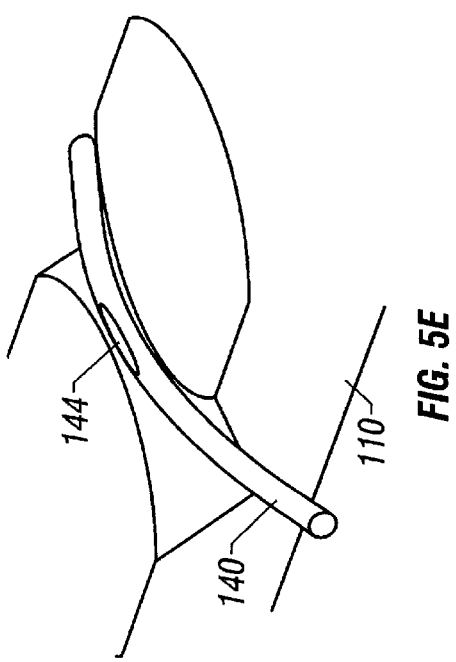
Figure 5D:
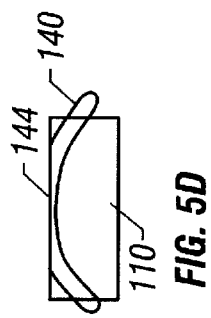

FIG. 5A shows one exemplary groove pattern 500 formed in the etching mask layer 430 in FIG. 4A. FIG. 5B illustrates the corresponding V groove 320 in the silicon substrate 110 formed from the anistropic etching by using the mask 500. The opening of the groove pattern 500 is designed to gradually widen from the center to both sides along the groove to be formed. Accordingly, the width and depth of the underlying V groove 320 also increase from the center portion 510 to side portions 520 that are spaced from the center along the groove 320. As illustrated, the surfaces of the V groove 320 are not flat but are curved as a result of etching through the above mask 500. FIGS. 5C, 5D, and 5E show the placement of fibers 140 in the above V-groove structure.

Figure 6:
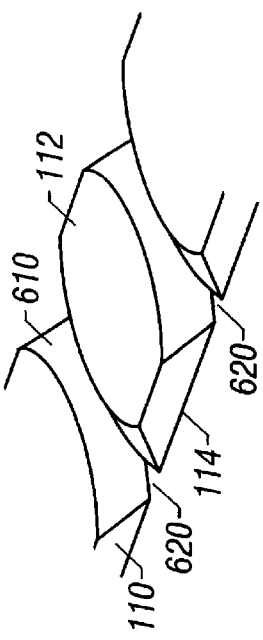
FIG. 6 illustrates formation of openings in V grooves by anistropic etching.

The above anistropic etching may be used to form both the V groove 320 and the openings 131 and 132 at both sides of the V groove 320 as shown in FIG. 1. Referring to FIG. 6, when opening of the groove pattern 500 in the etching mask 410 is sufficiently wide, side portions 620 of the V groove 610 can extend all the way through the substrate 110 from the surface 112 to the opposite surface 114 and hence create an opening 620 on the surface 114. The openings 620, therefore, can be used as the openings 131 and 132 to allow the fiber 140 to go through the substrate 110 from the surface 112 to the opposite surface 114.

Figure 7A:
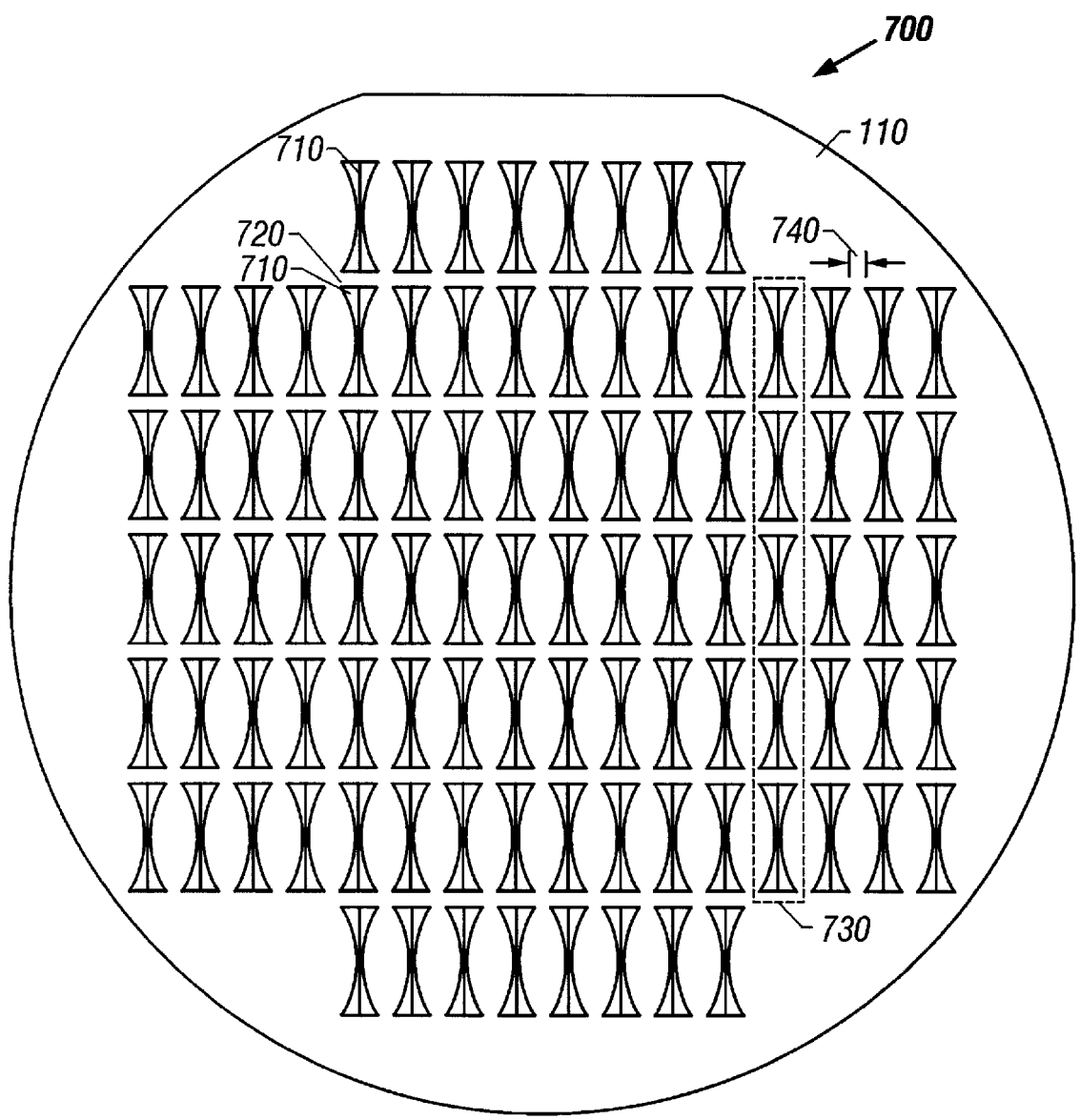
FIG. 7A shows a substrate that is fabricated with an array of grooves with openings.
Figure 7B:
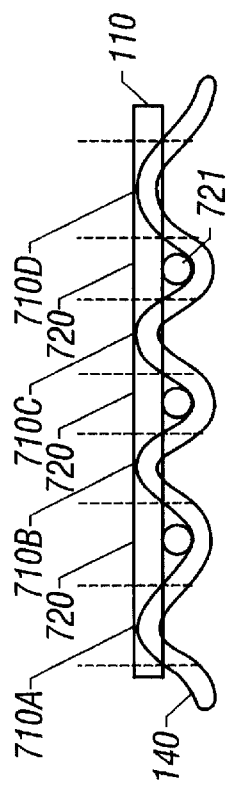
FIG. 7B shows a fiber device formed on a substrate with two or more grooves aligned with each other along a straight line on a single side of the substrate.

FIGS. 7A and 7B show that an array 700 of such V grooves 710 with two openings can be formed on one side of the substrate 110. The V grooves 710 may be aligned to be parallel to one another along their elongated directions and are arranged to form multiple parallel columns 730 with a spacing 740. Within each column 730, multiple V grooves 710 may be spaced from one another by a spacing 720. The substrate 110 with the array 700 may diced into multiple units each having one or more V grooves 710. Such units can be used to form various fiber devices. Hence, a batch fabrication process may be used to process the substrate 110 and to simultaneously form multiple fiber devices with V grooves 710.

A single fiber can be threaded through different V grooves 710 in a column 730 between the surfaces 112 and 114 via the openings 131 and 132. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After bonding and polishing the fiber 140, a coupling port is formed at each V groove on the surface 112 and is operable to couple optical energy out of or into the fiber 140. Therefore, this device has multiple coupling ports on the surface 112 to couple optical energy into or out of the fiber 140. When a proper control mechanism is implemented at each coupling port, optical switching, optical multiplexing, and other coupling operations may be achieved.

Figure 7C:
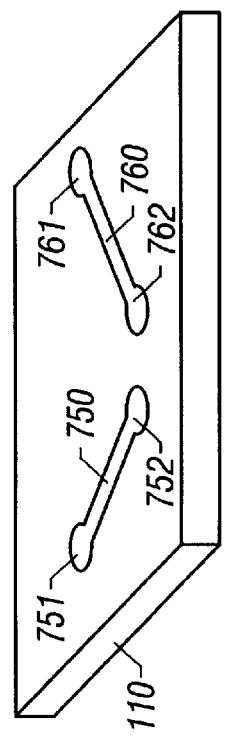
FIGS. 7C and 7D show fiber devices formed on a substrate with grooves on a single side of substrate that are oriented in different relative directions.
Figure 7D:
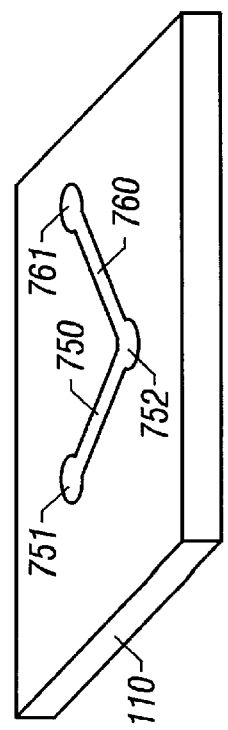

FIGS. 7C and 7D show additional embodiments of fiber devices that two different grooves 750 and 760 on the substrate 110 are not aligned along a straight line as in FIGS. 7A and 7B but form an angle with respect to each other. Numerals 751, 752, 761, and 762 indicate the openings of the grooves 750 and 760 that penetrate through the substrate 110. In FIG. 7C, the two grooves 750 and 760 are spaced from each other. A fiber may be placed in the grooves 750 and 760 by sequentially passing the fiber through the openings 761, 762, 752, and 751. In FIG. 7D, two grooves 750 and 760 are share a common opening 752. Such arrangements may be combined with aligned grooves.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
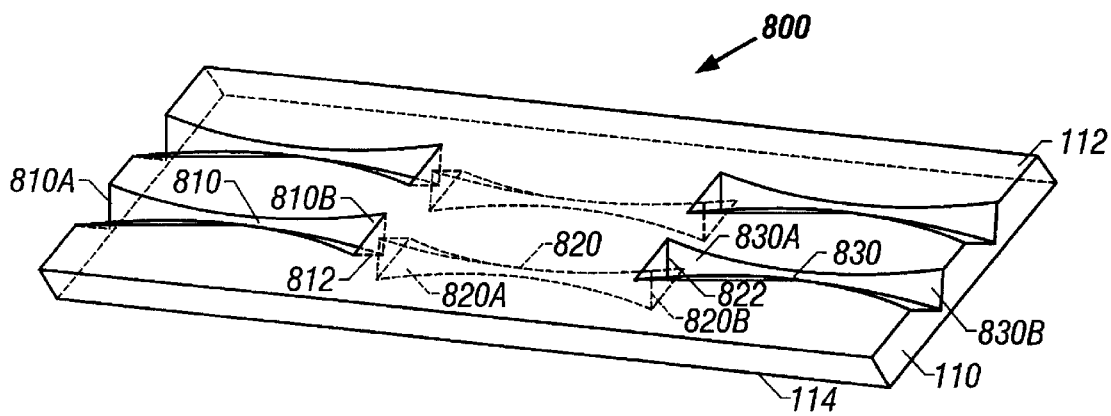
FIGS. 8A, 8B, 8C, 8D, and 9 illustrate substrates that are processed with grooves on both substrate surfaces.
Figure 8B:
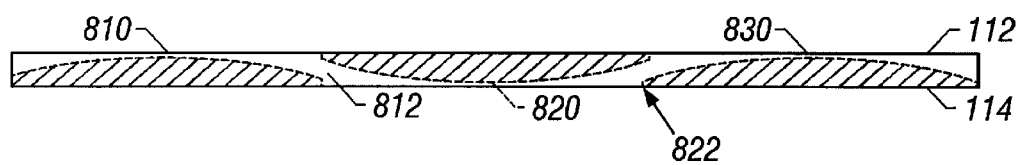
Figure 8C:

FIGS. 8A, 8B, and 8C illustrate one example of a fiber device 800 that has V grooves on both sides 112 and 114 of the substrate 110. A first V groove 820 is formed on the side 114. Similar to the V grooves in FIGS. 5B and 6, the depth and width of the V groove 820 increase from its center towards both ends 820A and 820B. A second, similar V groove 810 is formed on the opposite side 112 along the same groove direction. The end 810A of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. A fiber 140 is shown in FIG. 8C to thread through the holes 812 and 822 to form coupling ports on both sides 112 and 114 of the substrate 110.

Figure 8D:
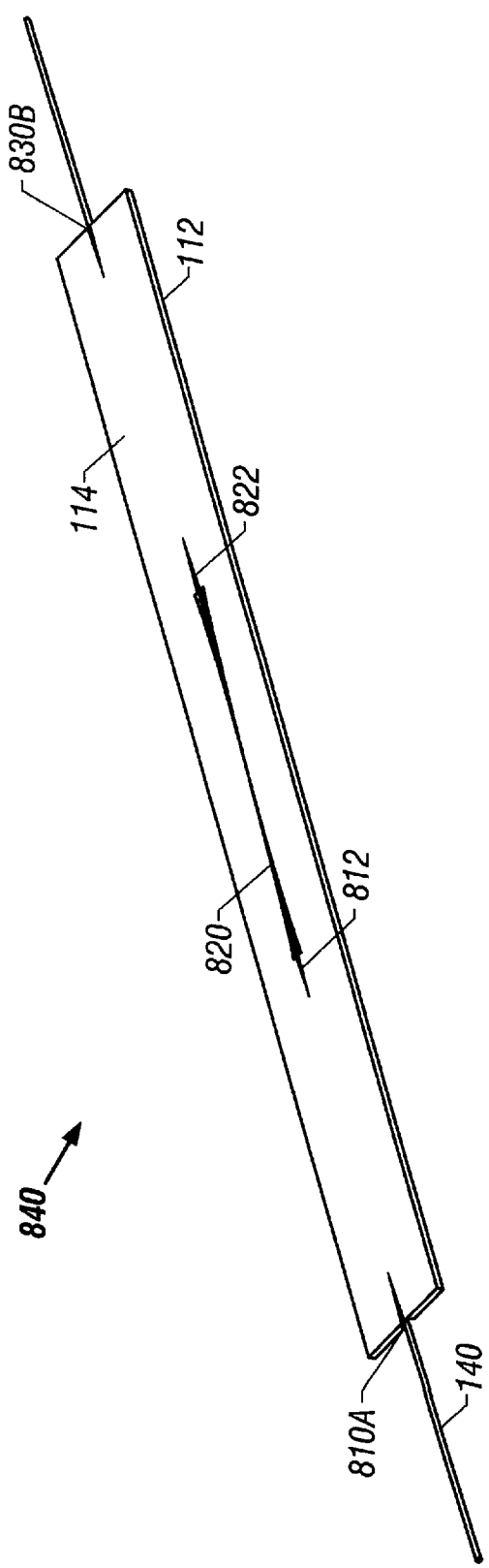
Figure 9:
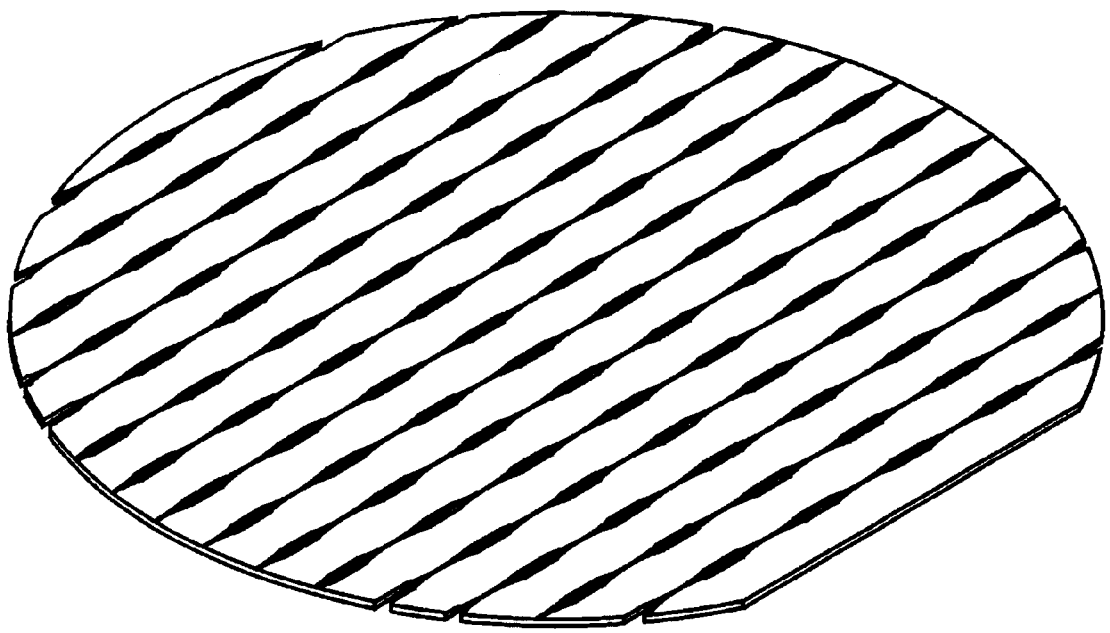

FIG. 8D shows a 3-port fiber device 840 that is formed by dicing a linear array of V grooves 810, 820, and 830 from the substrate 110. Comparing to the single-side device shown in FIG. 7B, the natural curvature of the V grooves formed on both sides eliminates the spacers 740. Similar to the batch fabrication of the single-sided devices shown in FIG. 7A, multiple double-sided devices may also be simultaneously fabricated from a single substrate as illustrated in FIG. 9.

In the above devices with V grooves formed on both sides of the substrate, two adjacent V grooves, located on opposite sides of the substrate, may not be aligned along a straight line but form an angle with each other as illustrated by the adjacent grooves formed on the same side shown in FIGS. 7C and 7D. Similar to the grooves in FIGS. 7A and 7B, two adjacent V grooves, located on opposite sides of the substrate, may also be designed to spatially separate from each other without sharing a common opening that penetrates through the substrate and extends between two sides of the substrate.

The openings in the above examples of V grooves are formed by anistropically etching for forming the V grooves. Hence, there is no need to use a separate process to fabricate the openings if the etching mask is properly designed. However, a separate fabrication step may also be used to form an opening and to achieve any desired geometric shape of the opening that may be difficult or impossible to make through etching the V grooves.

Figure 10:
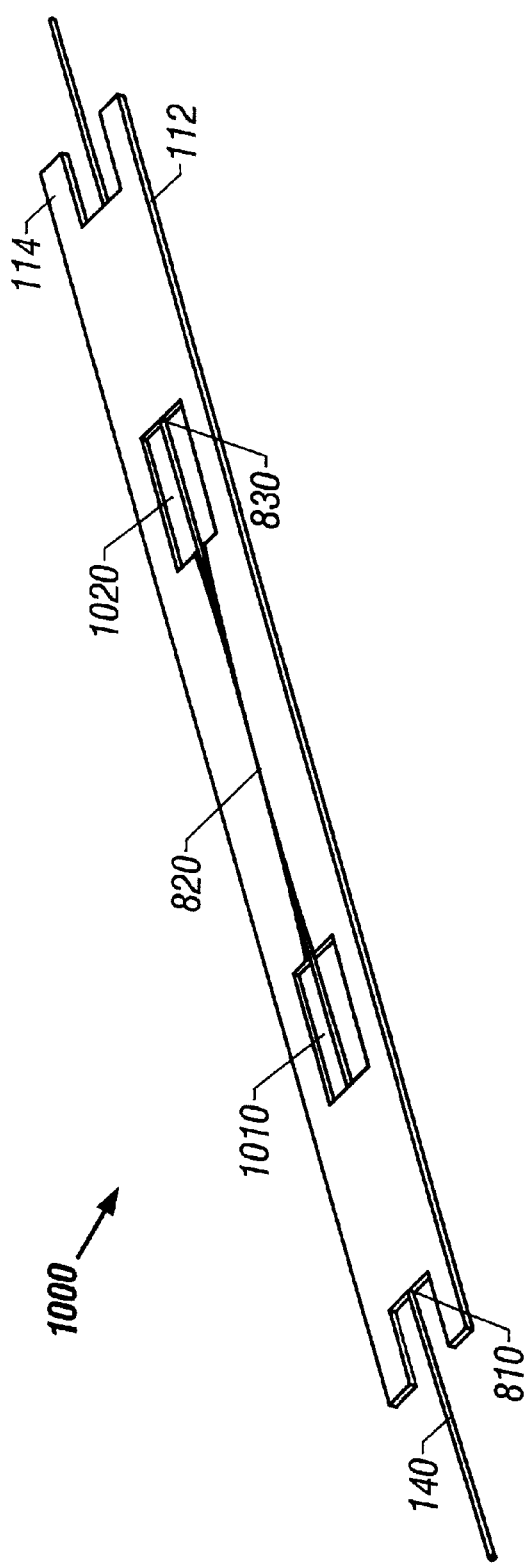
FIG. 10 shows a substrate processed with grooves on both substrate surfaces, where openings at both ends of each groove are separately fabricated from the V grooves.

FIG. 10 illustrates a fiber device 1000 with aligned V grooves 810, 820, and 830 on both sides 112 and 114 of the substrate 110 that are spaced from one another by rectangular openings 1010 and 1020. V grooves 810 and 830 are formed on the side 114 and the groove 820 is formed on the opposite surface 112 but is located between the grooves 810 and 830. An etching process separate from etching of the V grooves is needed to form such openings 1010 and 1020. Other processing techniques such as laser machining may also be used to form the openings.

The above fiber devices with V grooves either on one side or two sides may be used to form various fiber devices. Some exemplary devices are described below.

Figure 11:
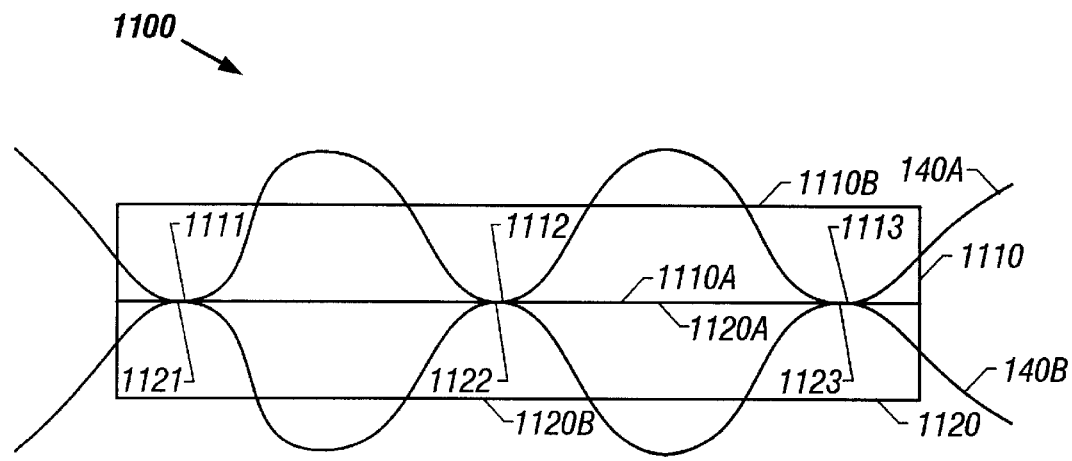
FIGS. 11 and 12 show exemplary fiber devices by integrating fibers to substrates with grooves.

FIG. 11 shows an optical fiber coupler 1100 by using two substrates 1110 and 1120 each with V grooves on a single surface of the substrate. The substrate 1110 has a surface 1110A on which three V grooves are fabricated and a fiber 140A is placed therein to form three coupling ports 1111, 1112, and 1113. Similarly, the substrate 1120 has a surface 1120A on which three V grooves are fabricated and a fiber 140B is placed therein to form three coupling ports 1121, 1122, and 1123. The two substrates 1110 and 1120 are engaged by having the surfaces 1110A and 1120A to face each other. The ports on one substrate substantially overlap with the coupling ports of another substrate to allow energy exchange between the fibers 140A and 140B. Various techniques may be used to engage the two substrates together, such as optical epoxy, glass frit thermal bond, CO2 laser assisted thermal bond.

A fiber device with V grooves on both sides of the substrate can be used to provide coupling on both sides. More coupling flexibility can be achieved in such a device than a device with grooves on only one side. For example, each fiber in the device 1100 shown in FIG. 11 cannot be accessed from the exposed surfaces 1110B and 1120B. Such access would be possible if one of the two substrates 1110 and 1120 were designed to have grooves on both sides. Thus, three or more substrates may be vertically stacked together to form a multi-layer optical coupler. Since each substrate may have two or more fibers, coupling among many fibers in different substrates may be achieved.

Figure 12:
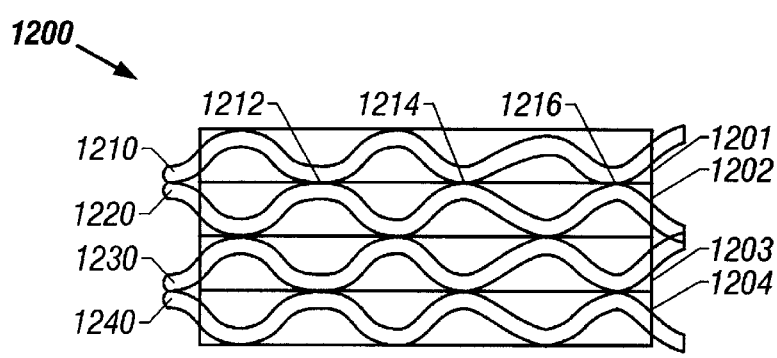

FIG. 12 shows a 4-layer optical multi-port coupler 1200 having 4 different double-sided substrates 1201, 1202, 1203, and 1204 based on the designs shown in FIGS. 8D or 10. Four different fibers 1210, 1220, 1230, and 1240 are respectively threaded in the substrates 1201, 1202, 1203, and 1204. Two adjacent substrates, such as 1201 and 1202, may be coupled to form the coupling ports 1212, 1214, and 1216. Hence, optical energy can be coupled between any two fibers. For example, an optical signal in the fiber 1210 may be coupled to the fiber 1230 by first coupling into the fiber 1220 and then coupling from the fiber 1220 into the fiber 1230. In general, a double-sided substrate can interface at both sides with other single-sided or double-sided substrates.

Figure 13A:
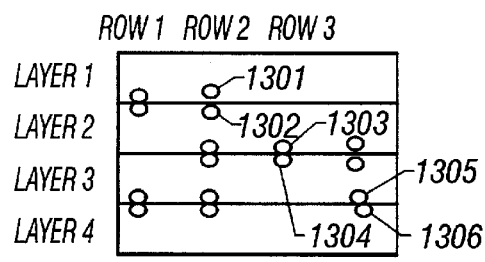
FIG. 13A shows uses of relative positions between grooves to control optical coupling between fibers positioned in the grooves.

FIG. 13A illustrates that optical coupling between two fibers in different layers may be controlled in a number of ways by controlling the relative position of the two fibers in grooves. For example, no optical coupling occurs between fibers 1301 and 1302 in the layers 1201 and 1202 when they are placed in deep grooves to have a separation much greater than one wavelength of the light. The fibers 1303 and 1304 in the layers 1202 and 1203 are positioned in shallow grooves so that a portion of each fiber's cladding is removed to allow for optical coupling. The depth of the grooves for the fibers 1303 and 1304 can be controlled to control the coupling strength via evanescent fields. The fibers 1305 and 1306, also in shallow grooves, are spatially offset in the lateral direction so that the optical coupling is reduced with the amount of the offset.

The grooves for holding fibers 1301 and 1302 are "deep" grooves in that the depth of the groove is greater than the diameter of the fiber so that the fiber cladding in the fiber portion in such grooves is not exposed above the substrate surface and no optical coupling port is formed. The grooves for holding the fibers 1303, 1304, 1305, and 1306, on the other hand, are "shallow" grooves as the groove 120 described with reference to FIG. 1 where a portion of a part of the fiber cladding protrudes above the substrate surface when the fiber is placed in such a groove and can be removed to form an optical coupling port 144. Such deep and shallow grooves may be combined to provide flexibility and versatility in routing fibers and arranging optical coupling ports in a fiber device.

Figure 13B:
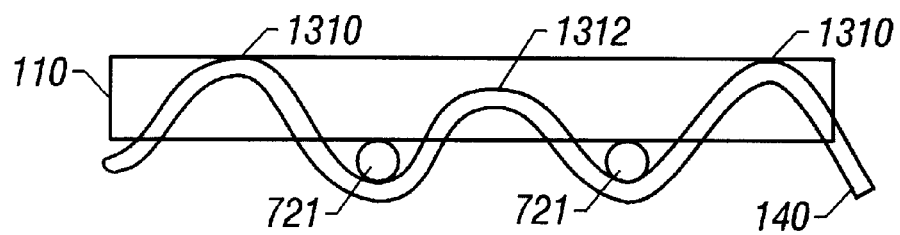
FIG. 13B shows a substrate with both deep and shallow grooves formed on a single side.
Figure 13C:
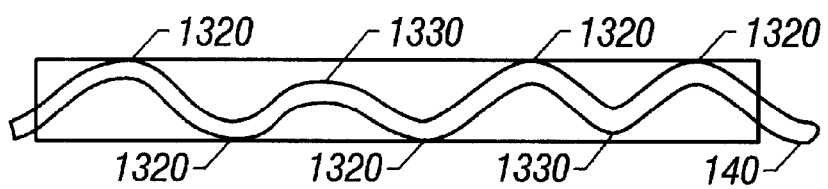
FIG. 13C shows a substrate with both deep and shallow grooves formed on both sides.

FIG. 13B shows a single-sided substrate similar to the substrate in FIG. 7B but processed to have both deep grooves 1312 and shallow grooves 1310. Each deep grove 1312 is used at a location where optical coupling is undesirable. FIG. 13C shows a double-sided substrate with deep grooves 1330 and shallow grooves 1320.

Figure 14:
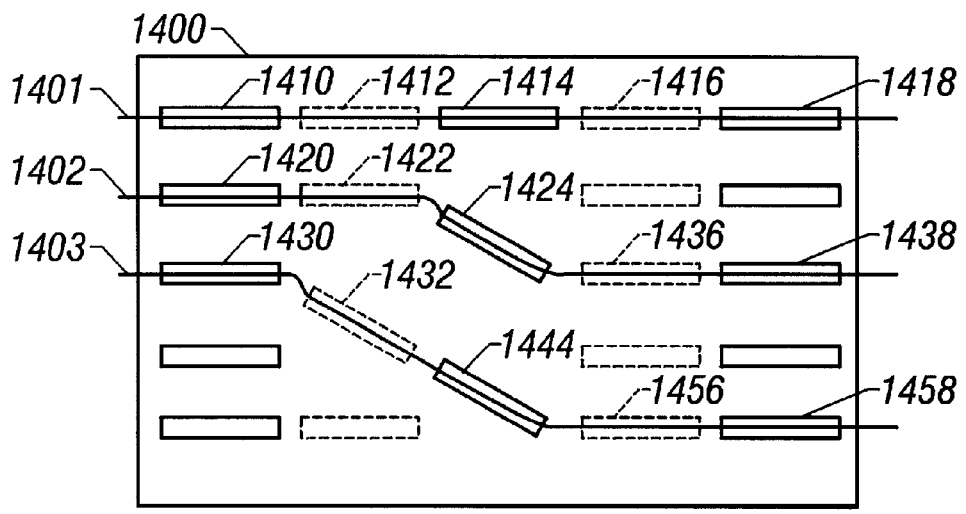
FIG. 14 shows an exemplary fiber device that has lateral jump-channel grooves on the substrate to change a direction of a fiber in the substrate plane.

FIG. 14 further shows that a lateral jump-channel groove 1424 on a substrate 1400 may be used to change the lateral direction of a fiber. The substrate 1400 is shown to have grooves on both sides. Solid elongated boxes such as 1410 represent grooves formed on one side and the dashed elongated boxes such as 1412 represent grooves formed on the other side. The grooves 1410, 1412, 1414, 1416, and 1418 are aligned with one another along a straight line to hold a fiber 1401. The groove 1424 is a lateral jump-channel groove that is oriented with an angle relative to adjacent grooves 1422 and 1436. Hence, a fiber 1402 can be threaded through the lateral jump-channel groove 1424 to run through grooves 1440 and 1422 and then to change its direction to run through grooves 1436 and 1438. Lateral jump-channel grooves 1432 and 1444 are also shown to direct the fiber 1402 from the groove 1430 to grooves 1456 and 1458. A single-side substrate with grooves on one side may also be designed to have such lateral jump-channel grooves.

Such a lateral jump-channel can be combined with the vertical integration of different double-side substrates to change the direction of an optical signal both laterally within a substrate and vertically from one substrate to another substrate. This opens up possibility similar to multi-layer printed circuit board technology allowing sophisticated connections from point to point and from layer to layer.

In the above devices, at least one buffer layer of a suitable material such as a dielectric material like silicon dioxide or silicon nitride may be formed over a groove under the fiber. This buffer layer may be designed to have certain mechanical or-thermal properties to stabilize the structure formed by the substrate, the buffer layer, and the fiber by reducing the mechanical or thermal stress between the silicon substrate and the glass fiber. Therefore the reliability of the device can be improved. For example, if the substrate is formed of silicon, a dielectric material with a coefficient of thermal expansion (CTE) between the CTE values of the silicon and the glass fiber may be used as the buffer.

Although a few embodiments are described, various modifications and enhancements may be made without departing from the following claims.

What is claimed is:

1. A device, comprising:
   a substrate having first and second opposing substrate surfaces to form a first elongated groove formed over said first substrate surface and first and second openings respectively formed at two ends of said first elongated groove, each opening formed through said substrate to extend between said first and second substrate surfaces; and
   an optical fiber, which comprises a fiber core and a fiber cladding surrounding said fiber core, passing through said first and second openings and having at least first, second, and third contiguous fiber portions, wherein said second fiber portion is disposed in said first elongated groove on said first substrate surface, and said first and said third fiber portions located on or over said second substrate surface.

2. The device as in claim 1, wherein said second fiber portion includes an area where at least part of said fiber cladding is removed to form an optical coupling surface which evanescently couples optical energy into or out of said fiber core of said optical fiber.

3. The device as in claim 1, wherein said second fiber portion is bonded to said first elongated groove.

4. The device as in claim 1, wherein said first elongated groove has a V-shaped cross section.

5. The device as in claim 1, wherein said first elongated groove has a U-shaped cross section.

6. The device as in claim 1, wherein said first elongated groove has a rectangular cross section.

7. The device as in claim 1, wherein said first elongated groove has a cross section forms at least a part of a circle.

8. The device as in claim 1, wherein said first elongated groove has a depth that increases from a center between said first and said second openings towards said first and said second openings.

9. The device as in claim 1, wherein said first elongated groove has a width that increases from a center between said first and said second openings towards said first and said second openings.

10. The device as in claim 1, further comprising a second elongated groove formed on said second substrate surface and positioned to have one end overlapping one of said first and said second openings to receive said third fiber portion,
wherein said substrate further includes another opening at another end of said second elongated groove to pass a fourth fiber portion adjacent to said third fiber portion through said substrate to be on or over said first substrate surface.

11. The device as in claim 10, wherein said second elongated groove is oriented along an elongated direction of said first elongated groove.

12. The device as in claim 10, wherein said second elongated groove is oriented to form a non-zero angle with respect to an elongated direction of said first elongated groove.

13. The device as in claim 10, wherein said third fiber portion includes an area where at least part of fiber cladding is removed to form an optical coupling surface which evanescently couples optical energy into or out of a core of said optical fiber.

14. The device as in claim 10, wherein said second elongated groove is sufficiently deep to keep said third fiber portion from protruding above said second substrate surface so that an optical coupling portion is not formed in said second fiber portion.

15. The device as in claim 10, further comprising a third elongated groove formed on said first substrate surface and positioned to have one end overlap said another opening of said second elongated groove to receive said fourth fiber portion.

16. The device as in claim 15, wherein each of said second, said third, and said fourth fiber portions includes an area where at least part of fiber cladding is removed to form an optical coupling surface which evanescently couples optical energy into or out of a core of said optical fiber.

17. The device as in claim 16, wherein at least two of said first, said second and said third grooves have different groove depths.

18. The device as in claim 16, further comprising a fourth opening at the other end of said third elongated groove to pass a fifth fiber portion adjacent to said fourth fiber portion through said substrate to be on or over said second substrate surface.

19. The device as in claim 1, wherein said substrate further includes:
a second elongated groove formed on said second substrate surface and spaced from said first elongated groove along said substrate; and
first and second openings respectively formed at two ends of said second elongated groove, each opening formed through said substrate to extend between said first and second substrate surfaces,
wherein a portion of said fiber is disposed in said second groove.

20. The device as in claim 19, wherein said substrate if formed of silicon and said buffer layer is formed of silicon nitride or silicon dioxide.

21. The device as in claim 1, further comprising a buffer layer formed between said groove and said fiber operable to reduce a mechanical or thermal stress between said fiber and said substrate.

22. The device as in claim 1, wherein said substrate further includes:
a second elongated groove formed on said first substrate surface and spaced from said first elongated groove; and
first and second openings respectively formed at two ends of said second elongated groove, each opening formed through said substrate to extend between said first and second substrate surface.

23. The device as in claim 22, wherein one opening at one end of said second elongated groove receives a fourth fiber portion adjacent to said third fiber portion on said first substrate surface, wherein another opening at another end of said second elongated groove receives and passes a fifth fiber portion adjacent to said fourth fiber portion through said substrate to be on or over said second substrate surface, and wherein said fourth fiber portion is placed in said second elongated groove.

24. The device as in claim 22, wherein said second elongated groove is oriented along an elongated direction of said first elongated groove.

25. The device as in claim 22, wherein said second elongated groove is oriented to form an angle with an elongated direction of said first elongated groove.

26. The device as in claim 22, further comprising a spacer positioned on said second substrate surface between said first and said second elongated grooves to support said third fiber portion and to reduce a bending of said third fiber portion.

27. The device as in claim 1, wherein said substrate is formed of a semiconductor, an insulator, or a metallic material.

28. A method, comprising:
providing a substrate having first and second opposing substrate surfaces;
processing said substrate to form an elongated groove over said first substrate surface;
forming two openings respectively at two ends of said elongated groove and through said substrate to extend between said first and second substrate surfaces; and
threading an optical fiber through said two openings to place a portion of said fiber in said elongated groove on said first substrate surface and to place two adjacent portions of said fiber on two ends of said portion on said second substrate surface.

29. The method as in claim 28, wherein said substrate is formed of a semiconductor material, wherein said processing includes an anistropic etching process to form a V-shaped cross section in said elongated groove.

30. The method as in claim 28, wherein a single fabrication process is used to form said elongated groove and said two openings.

31. The method as in claim 28, further comprising forming another elongated groove over said second substrate surface, wherein one end of said another elongated groove overlaps with one of said two openings.

32. The method as in claim 28, further comprising reducing a mechanical or thermal stress between said optical fiber and said substrate by forming a buffer layer in said elongated groove between said substrate and said optical fiber.

33. A device, comprising:
   first and second substrates, each substrate having first and second opposing substrate surfaces to include an elongated groove formed over said first substrate surface and two openings respectively formed at two ends of said elongated groove that go through said substrate to extend between said first and second substrate surfaces;
   a first optical fiber passing through said two openings in said first substrate to have a fiber portion positioned in said elongated groove in which a portion of fiber cladding is removed to form a first optical coupling port; and
   a second optical fiber passing through said two openings in said second substrate to have a fiber portion positioned in said elongated groove in which a portion of fiber cladding is removed to form a second optical coupling port,
   wherein said first substrate surfaces of said first and said second substrates are positioned to face each other to allow evanescent coupling between said first and said second optical fibers through said first and second optical coupling ports.

34. The device as in claim 33, wherein at least one of said first and said second substrates includes a semiconductor material, an insulator material, or a metallic material.

35. The device as in claim 33, wherein said first and said second optical coupling ports are spatially shifted along a direction parallel to each substrate to control a strength of said evanescent coupling.

36. The device as in claim 33, wherein depths of said elongated grooves in said first and said second substrates are selected to control an evanescent coupling strength between said first and said second optical coupling ports.

37. The device as in claim 33, wherein each substrate includes at least another elongated groove on said first substrate surface and two openings respectively formed at two ends of said another elongated groove that go through said substrate to extend between said first and said second substrate surfaces,
   wherein said another elongated groove in said first substrate receives another portion of said first fiber to form a third optical coupling port by removing part of fiber cladding, and
   wherein said another elongated groove in said second substrate receives another portion of said second fiber to form a fourth optical coupling port by removing part of fiber cladding, and said third and said fourth optical coupling ports are positioned to provide evanescent coupling between said first and second fibers.

38. The device as in claim 33, wherein said second substrate includes a second elongated groove formed over said second substrate surface and positioned to have one end overlap one of said two openings of said elongated groove on said first substrate surface to receive said fiber,
   wherein said substrate further includes another opening at another end of said second elongated groove to pass said fiber from said second substrate surface to said first substrate surface, and the fiber cladding of a portion of said fiber in said second elongated groove is removed to form a third optical coupling port, and
   said device further comprising:
   a third substrate having first and second opposing substrate surfaces to include an elongated groove formed over said first substrate surface and two openings respectively formed at two ends of said elongated groove that go through said third substrate to extend between said first and second substrate surfaces;
   a third optical fiber passing through said two openings in said third substrate to have a fiber portion positioned in said elongated groove in which a portion of fiber cladding is removed to form a fourth optical coupling port,
   wherein said first substrate surface of said third substrate is positioned to face said second substrate surface of said second substrate to allow evanescent coupling between said second and said third optical fibers through said third and said fourth optical coupling ports.

39. A device, comprising:
   a substrate having first and second opposing substrate surfaces and first, second, and third openings that are spaced from one another and go through said substrate to extend between said first and said second substrate surfaces;
   a first groove formed over said first substrate surface between said first and second openings to have a first end connected to said first opening and a second end connected to said second opening;
   a second groove formed over said second substrate surface between said second and third openings to have a first end connected to said second opening and a second end connected to said third opening; and
   an optical fiber engaged to said substrate by passing through said first, second, and third openings in said substrate to have a first fiber portion positioned in said first groove and a second fiber portion positioned in said second groove.

40. The device as in claim 39, wherein one of said first and said second fiber portions includes an area where at least part of fiber cladding is removed to form an optical coupling surface.

41. The device as in claim 39, wherein both said first and said second fiber portions include an area where at least part of fiber cladding is removed to form an optical coupling surface to allow optical coupling with said optical fiber from both said first and said second substrate surfaces.

42. The device as in claim 39, further comprising a buffer layer formed between each substrate surface and said optical fiber operable to reduce a mechanical or thermal stress between said optical fiber and said substrate.

43. A device, comprising:

a substrate having first and second opposing substrate surfaces;

a first elongated groove formed over said first substrate surface; and first and second openings respectively formed at two ends of said first elongated groove, each opening formed through said substrate to extend between said first and second substrate surfaces, wherein said first elongated groove has a depth that increases from a center between said first and said second openings towards said first and said second openings.

44. The device as in claim 43, wherein said first elongated groove has a width that increases from a center between said first and said second openings towards said first and said second openings.

45. The device as in claim 43, further comprising a second elongated groove formed on said second substrate surface and positioned to have one end overlap one of said two openings, wherein said substrate further includes another opening at another end of said second elongated groove.

46. The device as in claim 45, wherein said second elongated groove is oriented along an elongated direction of said first elongated groove.

47. The device as in claim 45, wherein said second elongated groove is oriented to form an angle with an elongated direction of said first elongated groove.

48. The device as in claim 45, wherein said first and said second elongated grooves have different groove depths.

49. The device as in claim 43, further comprising a fiber having a first portion positioned in said first elongated groove over said first substrate surface, a second portion immediately adjacent to said first portion to have a part in said first opening and another part over said second substrate surface, and a third portion, which is also immediately adjacent to said first portion, to have a part in said second opening and another part over said second substrate surface.

* * * * *